Patented Sept. 24, 1935

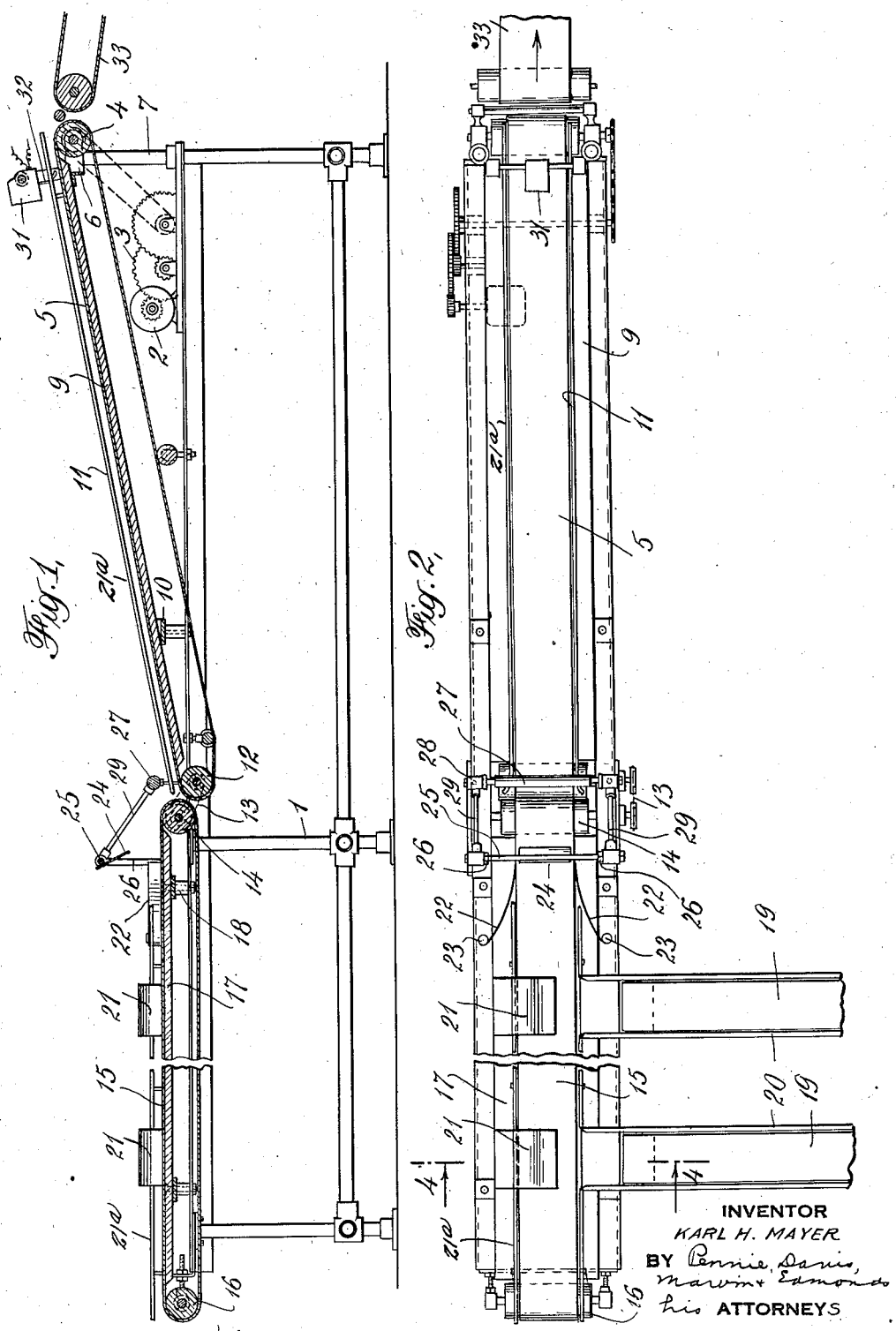

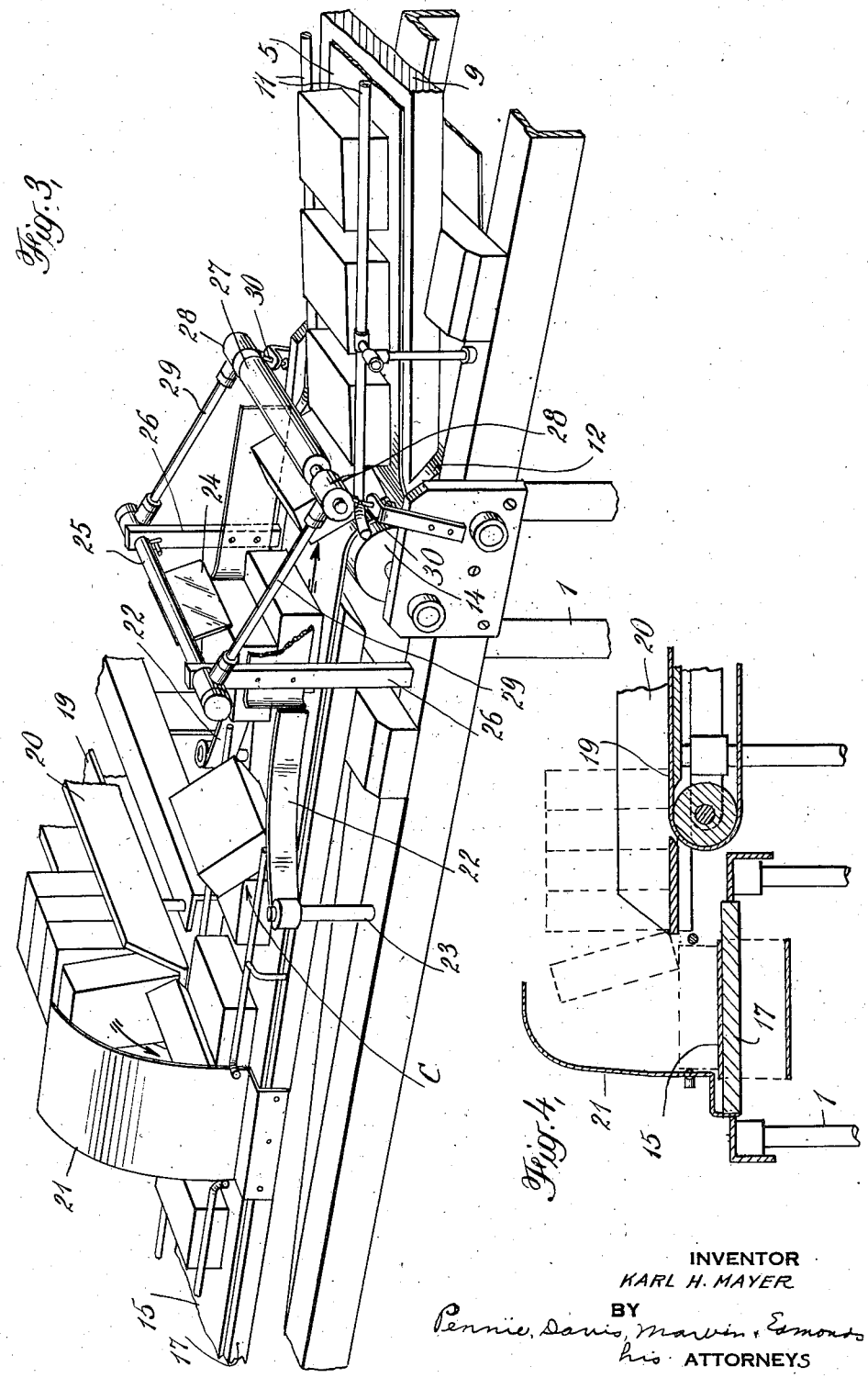

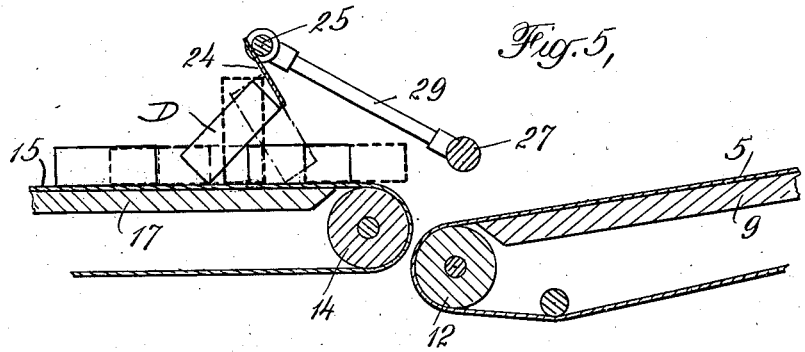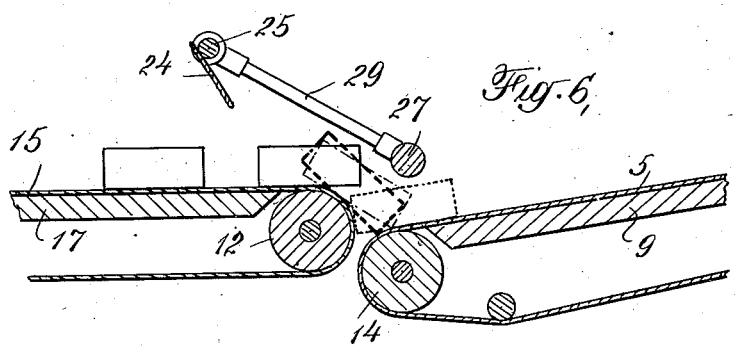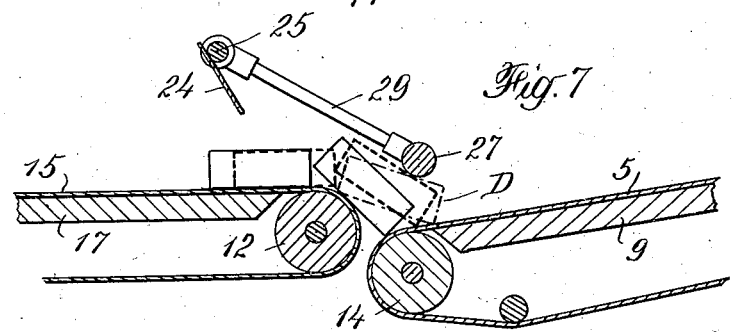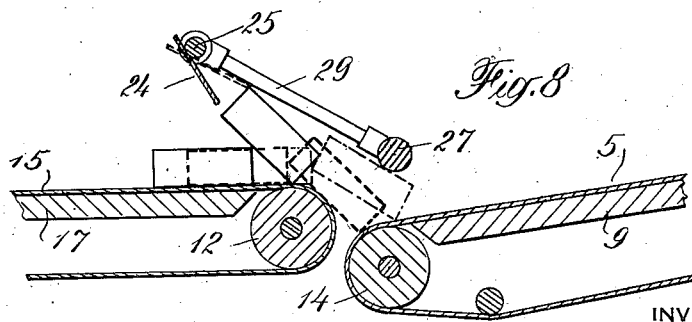

2,015,187

UNITED STATES PATENT OFFICE 2,015,187

PACKAGE ASSEMBLING MACHINE

Karl H. Mayer, Bronxville, N. Y., assignor, by mesne assignments, to Standard-Knapp Corporation, New York Application December 13, 1930, Serial No. 502,154

10 Claims. (Cl. 198—34)

This invention relates to article-feeding attachments, primarily intended for use in conjunction with packaging machines, such for example as we disclosed in Patent No. 1,942,555, granted January 9, 1934.

In packaging machines of this kind the articles to be packaged are delivered to the machine by a continuously operating conveyor belt, and if the articles are uniformly deposited on the belt with no gaps in the line of articles the machine will operate continuously to place a predetermined number of the articles in the carton and discharge the filled carton for delivery to the carton sealing machine or disposal otherwise. These packaging machines are designed to take a wide variety of articles such as bars of soap, packages of cereal and the like, and usually the capacity of the packaging machine is sufficiently great to take care of the output of several of the machines which prepare the articles to be packaged, for example soap wrapping machines if the article in question be soap.

Various machines have been devised for bringing several lines of articles delivered from a plurality of machines into a single continuous line. Such machines, however, for the most part have numerous moving parts, are expensive to manufacture and are not always reliable in operation.

The object of the present invention is to provide a machine of this type which has no moving parts except the belts which move the articles through the machine, and which is designed to receive the product of a plurality of separate machines whether the discharge from the separate machines be regular or intermittent, and arrange such articles on a single moving belt in a continuous line and in uniformly and equally spaced positions.

A further object of the invention is to provide a machine of this class which will be of low manufacturing cost, entirely automatic in its operation, and which may be operated at any desired rate of speed and thus render the machine adaptable for use with packaging machines of all kinds, with labeling machines or any other type of machine for performing some operation upon the articles of a character which the machine is designed to handle.

Referring to the drawings,

Fig. 1 shows a vertical longitudinal section through the entire machine.

Fig. 2 is a plan view of the machine shown in Fig. 1;

Fig. 3 is a perspective view showing the main operating portion of the machine;

Fig. 4 is a sectional view on line 4—4 of Fig. 2; and

Figs. 5, 6, 7 and 8 are diagrammatic views showing the operation of the machine on different arrangements of packages.

Referring to the drawings, 1 indicates the main frame of the machine, here shown as comprising a long, narrow table on which at one end the driving motor 2 is supported. This motor operates through a suitable reducing gearing 3 to drive a pulley 4 over which is trained a continuous conveyor belt 5.

The pulley 4 is supported in a bracket 6 mounted for vertical adjustment on the end post 7 of the machine frame and normally elevated above the table to substantially the position shown in Fig. 1. Also attached to the bracket 6 is a bed plate 9 forming a backing for the upper reach of the belt conveyor 5. The rear end of the bed plate 9 is supported on an adjustable bracket 10 carried by the top of the main frame and side guides 11 for the articles are also supported on the plate 9 to maintain the articles in alignment as they are advanced upwardly by the belt.

The other end of the belt 5 passes around a belt pulley 12 mounted in fixed bearings on the main frame. Attached to the shaft of the pulley 12 is a sprocket wheel which through a sprocket chain 13, serves to drive a belt pulley 14 also mounted in bearings on the main frame in a position both above and to the rear of the pulley 12. A second conveyor 15 is trained over the pulley 14 and extends around a pulley 16 adjustably supported at the extreme rear end of the main frame 1. The belt 15 is horizontal and its upper reach is supported by a bed plate 17 carried by brackets 18 projecting upwardly from the main frame. The belt 5 is driven at a higher speed than the belt 15 for a purpose which will be later described.

The articles to be packaged are delivered to the belt 15 by means of delivery chutes or other suitable means. The articles may be placed upon the belt 15 by hand, but in the usual setup of the machine the articles are delivered by delivery belts 19 working in the delivery chutes 20 to feed lines of articles standing on end to the belt 15.

In the embodiment selected for illustration the articles to be packaged are boxes of cereal. In the drawings I have shown two such delivery chutes for delivering the articles to the belt 15 but any desired number may be employed, the speed of the belt 15 being so adjusted that the normal output of the two or more delivery chutes, as the case may be, will provide a single continuous line of uniformly spaced packages on the belt 5. In this embodiment it will be understood that the two delivery belts 19 move continuously and without timed relation to discharge the cereal packages onto the belt 15.

As shown particularly in Fig. 4 the bottom of the delivery chute is elevated above the belt 15 a distance slightly greater than the thickness of the cereal box, so that if a box has been deposited on the belt by the first feed chute 20 at a point which is opposite the second feed chute at the moment of discharge of the article from the second feed chute, the article will be discharged onto the top of the article already on the belt. Thus the articles on the belt 15 may be but one article deep or may be two packages deep, with the second article lying flat on the first article, or may be overlying the front edge of the under article, as illustrated at C in Fig. 3, or may be overlying the rear edge of the article as illustrated at D, Fig. 5. In whatever manner the articles may be arranged on the belt 15, the apparatus mounted at the junction of the two belts 5 and 15 serves to straighten out the articles so as to travel up the belt 5 in a continuous line of uniformly spaced articles so long as the supply of articles to the belt 15 is maintained.

Shields 21 are attached to the bed plate 17 opposite the discharge ends of the feed chutes 20 and operate to prevent the packages discharged from the feed chutes from projecting beyond the edge of the belt 15 as they are discharged thereon. Guide rods 21ᵃ extend along the table overlying the edges of the belts to maintain the articles on the belts. Each shield 21 comprises an upstanding piece of sheet metal curved in the manner shown so as to deflect the falling article down onto the belt or onto the articles from the previous feed chute which may already be thereon.

In advance of the shield 21 are a pair of fixed edge guides 22 of spring metal supported on the frame of the machine by posts 23 and projecting upwardly from the side members of the machine frame so as to support the guides 22 above the plane of the belt 15. The guides 22 serve to center the advancing articles with respect to the belt 15, as will be obvious. In advance of the guides 22 is an article deflector 24 consisting of a metal plate depending from a rod 25 rotatably supported at its ends in suitable bearings carried by posts 26 projecting upwardly from the side walls of the frame. The lower edge of the metal plate 24 is spaced from the plane of the belt 15 by a distance less than twice the thickness of the articles so that it will be engaged by any articles which are resting on other articles or which are standing on edge on the belt.

The metal plate is heavy enough with respect to the force exerted on it by the moving articles to stop the movement of such articles as may be resting flat on top of another article, as illustrated in Fig. 3 and thereby speed the uppermost article off the under article onto the belt. The plate 24 also serves to turn the articles which may be resting in an inclined position on the rear edge of a lower package backward either to a position flat on the belt, if the belt is clear back of such articles, or over against the forward edge of the article to the rear, as indicated in dotted lines in Fig. 5. The third way in which articles may be presented to the plate 24 is illustrated at C in Fig. 3, that is, the uppermost article may rest against the forward corner of the article which is flat on the belt. When the articles are so arranged the plate 24 will swing out of the way and pass over the upper edge of the article. To this end the face and lower edge of the plate 24 are machined and polished so as not to abrade or damage the article.

It will be understood that the speed of the belt 15 is fast enough with respect to the maximum rate of delivery of articles to the belt to accommodate all the articles if spread out flat on the belt so that any accumulation of articles at one point on the belt will be followed by blank spaces in which the articles may be spread out.

The articles leaving the plate 24 are thus either flat on the belt or in the position shown at C. Means are provided in advance of the plate 24 for delivering articles so arranged to the belt 5 in uniformly spaced relation. This means comprises a roller 27 mounted in a fixed position above the axis of the shaft of the pulley 12 of the belt 5 and with its lower edge slightly above the plane of the belt 15. The roller 27 is adjustably supported and its position with respect to the belts depends on the dimensions of the articles being handled by the machine. To this end the journals 28 of the roller 27 are carried by arms 29 mounted to rotate freely about the rod 25 so that as the roller is adjusted to a more elevated position for larger size articles, it will also be moved further away from the belt 15 to thus allow the larger articles to tilt downwardly before engaging the roller 27.

Suitable adjusting screws 30 are provided in each of the journals 28 for maintaining the roller 27 accurately in its proper position of adjustment.

The action of the roller 27 in adjusting the articles as they pass onto the belt 5 is illustrated in Figs. 6, 7 and 8. Consider first an article lying flat on the belt 15. The roller is so adjusted with respect to the surface of the pulley 12 which supports the forward end of the belt 15 that the article will not engage the roller 27 until it has tilted forward onto the belt 5 which it first engages with its forward side edge. If however there is a second package closely adjacent the first on the belt 15 as shown in Fig. 7, thus tending to hold the first package in upright position, the flat side of the first package above its middle line will come into engagement with the roller 27 and as the lower end of the package is being continuously advanced by the belt 5, the package will be positively tilted until it rests flat on the belt 5, the second package being held against further movement until the first package is out of the way. If the space on the belt 15 immediately to the rear of the package is clear as shown in Fig. 6, the package will turn into horizontal position as it is advanced by the belt 5 without engaging the roller 27. When the several closely adjacent articles on the belt 15 come to the roller 27 they will be spaced apart on the belt 5 because each article will be held against movement by the roller 27 until the article immediately in front has advanced a sufficient distance for the next article to tilt over onto the belt 5, thus insuring a space between the articles on the belt 5.

The roller 27 also serves to space apart two articles, when their position with respect to each other is as shown at C in Fig. 3. As the two articles so arranged pass over the pulley 14 the upper article which is already in inclined position will drop down under the roller 27 as shown in Fig. 8 in position to be tilted by the belt 5 and the lowermost article will be held against forward movement until the uppermost article clears the roller 27. It will then follow the uppermost article in orderly sequence onto the belt 5.

The operation of the packaging machine is preferably controlled by the articles advancing on the belt 5. To this end there is provided an electrical control switch 31 mounted adjacent the delivery end of the belt 5 and comprising depending arm 32 so shaped that it cannot drop to its fully downward position so long as the articles are advanced in the positions determined by the roller 27. Whenever there is a gap in the line of articles on the belt 5 as will be occasioned by a failure of the article supply for an appreciable time the switch arm 32 drops, thereby stopping the packaging machine, including the feed belt 33 thereof, which will remain stationary until the packages on the belt 5 again rotate the switch arm. Thus any gaps on the belt 5 will be closed up when the line or articles reaches the belt 33, thus insuring a continuous supply of articles to the packaging machine whenever the latter is in operation.

While the machine of the present application is designed primarily for use in connection with packaging machines as disclosed in our copending application above referred to, it is by no means restricted to such use. It may be advantageously employed for a variety of purposes.

It is also to be understood that the invention is not limited to the details of construction herein shown and described except insofar as defined in the appended claims.

The expression "groups of articles" as used in the appended claims is intended to mean the succession of articles delivered to the machine between stoppages of the supply of articles of such duration as will cause the accumulation of articles on the feed belt 15 adjacent the stop 24 to become exhausted.

I claim:

1. In an apparatus of the class described, the combination of a conveyor for advancing groups of articles, a second conveyor arranged adjacent the first said conveyor for continuing the advance of said articles, the articles in each of said groups being irregularly arranged on the conveyor, and means at the junction of said conveyors for arranging and spacing the articles of each group as advanced from one conveyor to the other into a line of uniformly spaced identically arranged articles.

2. In an article of the class described, the combination of a first conveyor, means for delivering groups of articles thereto in irregular arrangement, a second conveyor arranged in advance of the first conveyor and with its receiving end adjacent to and below the surface of the first conveyor, the articles in each group being in sufficient quantity so that they would be in end to end contact as they approach said second conveyor if lying flat, means adjacent the junction of the two conveyors for engaging the articles of each group improperly disposed on the first conveyor and arranging them in uniformly spaced position as they are advanced by the second conveyor.

3. In an article of the class described, the combination of a first conveyor, means for delivering groups of articles thereto in irregular arrangement, a second conveyor arranged in advance of the first conveyor and with its receiving end adjacent to and below the surface of the first conveyor, the articles in each group being in sufficient quantity so that they would be in end to end contact as they approach said second conveyor if lying flat, means adjacent the junction of the two conveyors for engaging the articles of each group improperly disposed on the first conveyor and arranging them in uniformly spaced position as they are advanced by the second conveyor, said means comprising a member overlying the first conveyor in position to engage an article superimposed on the second article, and a second member to engage articles reaching the second belt in a position other than they would assume if moving freely through the machine.

4. In an article of the class described, the combination of a first conveyor, means for delivering groups of articles thereto in irregular arrangement, a second conveyor arranged in advance of the first conveyor and with its receiving end adjacent to and below the surface of the first conveyor, the articles in each group being in sufficient quantity so that they would be in end to end contact as they approach said second conveyor if lying flat, means adjacent the junction of the two conveyors for engaging the articles of each group improperly disposed on the first conveyor and arranging them in uniformly spaced position as they are advanced by the second conveyor, said means comprising a roller overlying the end of the second conveyor and in the plane of movement of the articles on the first conveyor.

5. In a device of the class described, two conveyors arranged end to end to deliver articles the one to the other, means for delivering articles to said first conveyor in irregular arrangement some of the articles resting on others, deflecting means for altering the position of the articles on said first conveyor so that all of said articles will either lie flat on the conveyor or some will lie flat on the conveyor with others resting in an inclined position against the forward edge of articles which lie flat on the conveyor, and article spacing means at the junction of said conveyors for causing the articles so arranged to be delivered to said second conveyor in uniformly spaced relation.

6. In an apparatus of the class described, the combination of a first conveyor, means for delivering groups of articles thereto in irregular arrangement some of said articles resting one on another, a second conveyor arranged in advance of the first conveyor and with its receiving end adjacent to and below the surface of the first conveyor, and an article arranging mechanism coacting with said conveyors comprising a yieldably mounted member disposed over said first conveyor, and a fixed member disposed over said second conveyor adjacent the end of said first conveyor whereby said articles are rearranged on said second conveyor in equally spaced relation.

7. In a device of the class described, the combination of means for advancing articles in irregular and piled arrangement, means acting on the articles as they are advanced for rearranging certain of the piled articles to lie in the same plane, a second article-advancing means and a second article-engaging means operating to engage articles improperly positioned, and position them as they are acted upon by the second advancing means, said article-engaging means operating to engage the said improperly positioned articles as they pass from the first advancing means to the second advancing means.

8. In a device of the class described, the combination of means for advancing articles in irregular and piled arrangement, means for aligning said articles with the direction of advance, means acting on the articles as they are advanced for rearranging certain of the piled articles to lie in the same plane, a second article-advancing means and a second article-engaging means operating to engage articles improperly positioned, and position them as they are acted upon by the second advancing means, said article-engaging means operating to engage the said improperly positioned articles as they pass from the first advancing means to the second advancing means.

9. In an apparatus of the class described, the combination of means for advancing articles, article-arranging mechanism comprising a member spaced above said advancing means and adapted to engage and rearrange articles piled one on the other to a desired position, a second article-advancing means and a second member spaced from both said advancing means a distance to permit the unobstructed passage of a single article in the desired position and to engage articles not so positioned and hold them against advance until shifted into the proper position by said article-advancing means, said second member engaging the articles not in the desired position as they pass from the first advancing means to the second advancing means.

10. In a device of the class described, the combination of means for advancing articles in irregular and piled arrangement, means acting on the articles as they are advanced for rearranging certain of the piled articles to a desired position, a second article-advancing means adapted to receive articles discharged from the first article-advancing means, the portion of the first article-advancing means from which the articles are discharged being located at a higher level than the portion of the second article-advancing means which receives the articles, and means for positioning articles which were not properly positioned while on the first article-advancing means as said articles pass from the first article-advancing means to the second article-advancing means.

KARL H. MAYER.